United States Patent [19]

Heitkamp et al.

[11] 4,416,860
[45] Nov. 22, 1983

[54] METHOD AND APPARATUS FOR RECOVERING RAW MATERIAL, ESPECIALLY URANIUM, FROM NATURAL WATERS, ESPECIALLY FROM THE SEA

[75] Inventors: Dieter Heitkamp, Jülich; Peter Inden, Aachen, both of Fed. Rep. of Germany

[73] Assignee: Kernforschungsanlage Jülich Gesellschaft mit beschränkter Haftung, Jülich, Fed. Rep. of Germany

[21] Appl. No.: 262,829

[22] Filed: May 12, 1981

Related U.S. Application Data

[63] Continuation of Ser. No. 104,812, Dec. 18, 1979, abandoned.

[30] Foreign Application Priority Data

Dec. 18, 1978 [DE] Fed. Rep. of Germany ....... 2854679

[51] Int. Cl.³ .................... B01D 15/02; C02F 1/28
[52] U.S. Cl. .................................. 423/6; 210/676; 210/682; 210/747; 210/170
[58] Field of Search ............ 210/682, 688, 189, 198.1, 210/484, 675, 679, 681, 676, 747, 170; 423/6, 7

[56] References Cited

U.S. PATENT DOCUMENTS

| | | | |
|---|---|---|---|
| 3,155,454 | 11/1964 | Salotsky et al. | 210/682 |
| 3,976,570 | 8/1976 | McCray | 210/671 |
| 4,134,831 | 1/1979 | Dawson et al. | 210/675 |
| 4,277,345 | 7/1981 | Heitkamp et al. | 210/682 |

*Primary Examiner*—Ivars C. Cintins
*Attorney, Agent, or Firm*—Becker & Becker, Inc.

[57] ABSTRACT

A method and apparatus for recovering raw material, especially uranium, from natural waters, especially from the sea. Carrier bodies capable of sinking are permitted to pass, in a free fall, through a layer of water, especially a natural sea current or stream, by concentration on the carrier bodies, which are collected at an appropriate depth and are then conveyed from there for further treatment. Carrier bodies of inert material are used having a protected outer surface with a thin layer, capable of being concentrated, coated thereon. The distance of falling amounts to approximately 100 meters. The apparatus for carrying out the method includes a carrier body discharge located below water level. One end of a carrier body path has a collection device for collecting carrier bodies and is directed toward the conveyor path. The apparatus also has a conveying device operating especially hydraulically according to the principle of communicating pipes. The conveying device returns the carrier bodies to the outlet or discharge by way of a further treatment location.

17 Claims, 13 Drawing Figures

METHOD AND APPARATUS FOR RECOVERING RAW MATERIAL, ESPECIALLY URANIUM, FROM NATURAL WATERS, ESPECIALLY FROM THE SEA

The present application is a continuation of parent application Ser. No. 104,812—Dieter Heitkamp et al—filed Dec. 18, 1979, now abandoned.

The present invention relates to a method of and apparatus for recovering raw material, especially uranium, from natural waters, especially from the sea, by enrichment or concentration on carrier bodies.

Sea water contains a series of economically meaningful raw materials, such as, for example, metals, like uranium, copper, tin, silver and the like, in dissolved form. Even though these raw materials or metals mostly occur only in very nominal concentrations, they represent a large supply potential in view of the large quantities of water of the oceans. Uranium, for example, is contained in sea water in a concentration averaging only 3.3 ppb. Nevertheless, the uranium supply of the world's seas is greater by approximately a factor $10^3$ than the present day estimates of known terrestrial occurrence of exploitable accessible quantities.

Basically, the starting portion is on the basis that for recovering raw material, sea water must be brought into contact with solid bodies in continuous passage, which have the concentration capability for the raw material dissolved in sea water, as for example special adsorbers or ion exchangers. The usually dissolved raw materials, such as also uranium existing as carbonate complex, are distributed relatively uniformly over the sea water, with only nominal local concentration differences. Accordingly, they can be recovered at any expedient location. The extraordinarily small concentrations, however, represent a considerable hindrance for a technical recovery method or procedure. Very large quantities of sea water must be contacted with the adsorber in order to be able to recover an economically advantageous quantity of raw material. For recovering uranium, approximately one billion cubic meters ($10^9$ $m^3$) of sea water are needed per day for one ton of uranium.

A series of methods have been suggested to bring concentratable solid bodies into contact with large quantities of water.

According to a method suggested by the Atomic Research Establishment, Harwell, 1968 (Davies. R. V. et al Nature (London) 203 (1964) 1110), an adsorptive effective solid or fixed bed (for instance a granulate fill) is embedded in an earth dam or sea wall. This bed divides a natural bay or gulf in such a manner that the tidal flow, which is allowed over a sluice or floodgate into the bay or gulf, must pass the adsorber bed in the dam in order to be able to flow away again into the sea by way of a different part of the bay or gulf. The natural characteristics necessary for this purpose, such as a sufficiently large tidal lift and a suitable form, size and geology of the bay or gulf, can be found only at a few locations of the earth. Even when these preconditions are fulfilled, the flow resistance of the solid or fixed bed is so great that this can be equalized only by a correspondingly large bed cross section. For a plant capacity of approximately one ton per day, the gigantic dimensions of approximately 50 meters dam width and 20 kilometers dam length would be necessary. This, however, would lead to preparation problems difficult to resolve, and would collectively lead to unacceptable costs.

Furthermore, the recovery of uranium from the cool water flow of power plants was taken into consideration. However, the uranium quantities recoverable in this manner are too small; moreover, similar disadvantages exist as with the previously discussed tidal method.

According to a different concept, a sea water flow is to pass or flow parallel to the surfaces of adsorber coated plates or bands having 0.1 to 10 mm spacing (Japanese Pat. No. 51-67217 and C. Bettinali and F. Pantanetti, Proceedings IAEA-AG/33-4 Vienna 1976). In order to attain a sufficient raw material depletion of the sea water, there would be needed under such circumstances several sequentially arranged plates, resulting in the formation of a plate system with an overall estimated length of up to 200 meters. An essential disadvantage of this arrangement, as with the solid or fixed bed, is the very high flow resistance. This is naturally true also when the plates are replaced by endless bands for improvement of a continuous adsorber exchange (U.S. Pat. No. 3,763,049). As a consequence of the high water pressures which arise, considerable fastening problems exist, as does the danger that the plates or bands may vibrate and become damaged or come into engagement with each other, which leads to rubbing off or removal of the adsorber.

Finally, a flow-bed method was taken into consideration, according to which a long adsorber bed has sea water flowing therethrough from below, and adsorber granulate is whirled or churned up. In order to stabilize the granulate in the bed, the granules must be kept suspended by accurate setting or adjustment of the sinking speed thereof and the flow speed of the sea. The granulate can flow transverse to the direction of flow of the sea by feeding or delivery of new substance in the direction of a granulate suction location, and thus continuous exchange can be brought about. However, a considerable pump complexity must be driven or operated to attain the necessary upward flow of the sea in the adsorber bed. During the utilization of natural sea flow subject to diverting or reversal into a vertical upwardly directed flow direction, great difficulties are brought about both as to flow control and bed stabilization, and also as to the necessary anchoring against the considerable pressure forces of the flowing water. Disadvantageous additionally is that as a consequence of the reduction of the particle size of the granulate caused by reciprocal wear or abrasion thereof, and thereby a reduction of the sinking speed thereof, a portion of the adsorber is washed away.

It is an object of the present invention to provide a method and apparatus for recovering raw materials from natural waters, especially sea water, with which also very large water quantities can be contacted in a continuous operating manner with concentratable solid bodies with the least possible technical complexities; whereby, subject to avoiding the drawbacks of the previous methods, on the one hand unhindered access of the water to the effective upper surfaces is assured, and on the other hand pressure and flow resistance are kept small.

This object and other objects and advantages of the present invention, will appear more clearly from the following specification in connection with the accompanying drawings, in which.

Figure 1:
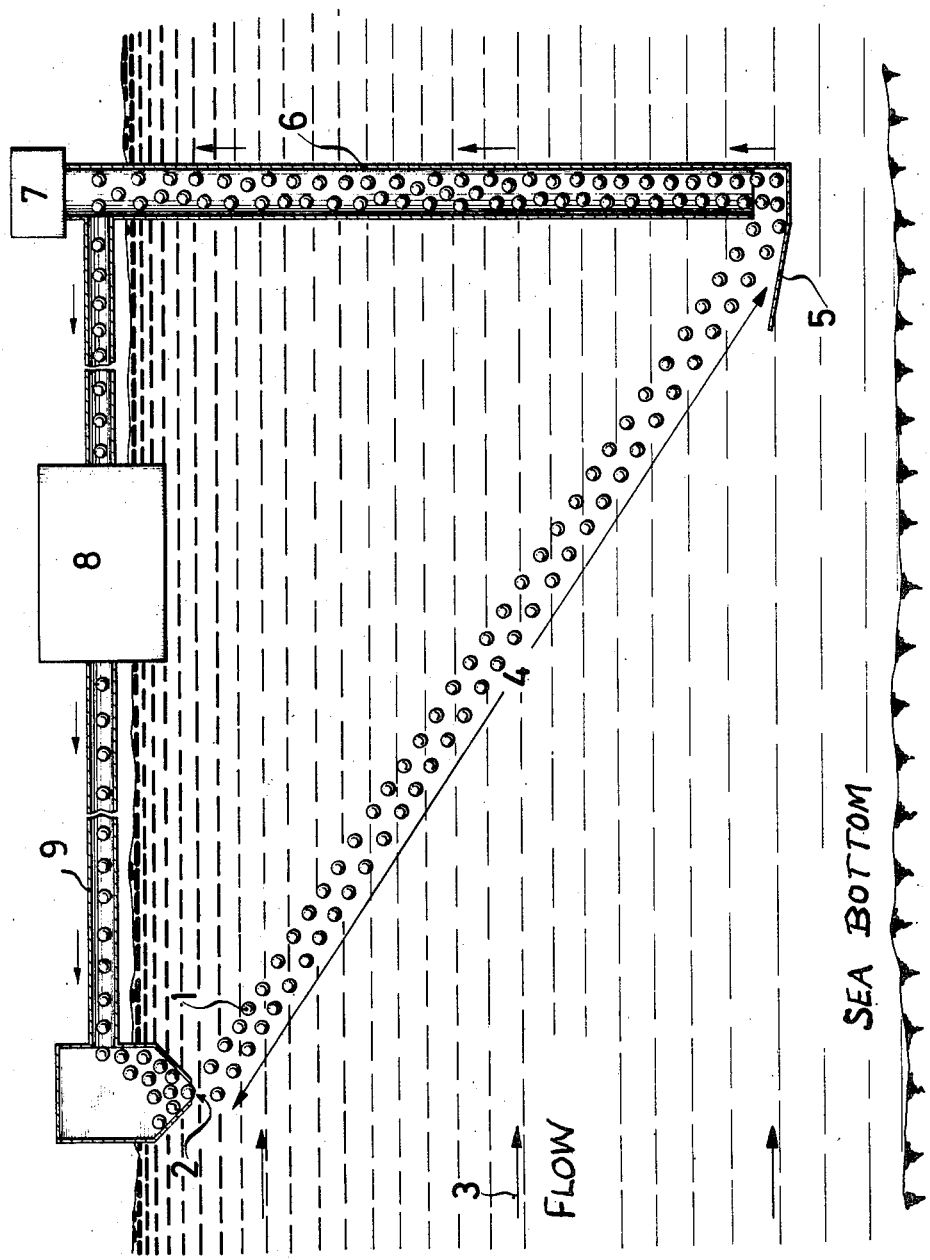
FIG. 1 is a side elevational view showing in principle a system for recovering uranium from sea water.

The method of the present invention is characterized primarily in that sinkable carrier bodies are permitted to pass a water layer, especially a natural sea current, in free fall, are collected at an appropriate depth, and are then conveyed from there for a further treatment. The concentration on the carrier bodies can occur in any suitable manner, whereby especially adsorption by physical or chemical forces or adding on or accumulation by binding, such as especially complex formation and ion exchange, are to be mentioned. The concentration active centers under these circumstances are arrested or held at or in the carrier bodies (which in essence could consist of concentration active material), especially in the form of a thin layer anchored or retained on or in a surface accessible for the water, so that an access of the water is possible to the concentration-active centers during the falling time of the body. The carrier bodies accordingly are to have the greatest possible surface area, and this sufrace must be accessible for the surrounding water in an unhindered a manner as possible.

On the other hand, however, there is to be avoided that concentration-active material is lost in a mechanical manner by abrasion or by rubbing off. Therefore, the carrier body should be so provided or supplied that the surface(s), which are furnished with concentration-active centers, are not subjected to abrasion or friction by contact with any material, such as neighboring bodies.

In the scope of this requirement, the carrier bodies can have any suitable form. Especially expedient at present, however, is a generally spherical form, which is formed by a framework or structure of interfitting discs, lamella, sheets or surfaces. Likewise, however, other bodies are conceivable which provide the identical aforementioned characteristics, for example, sponge-like or fibrous structures which are suitably provided with mechanical and wear resistant properties by way of a grid, jacket, or casing.

The size of the bodies depends both upon the hydrodynamic behavior thereof, and also the transporting capability and further treatment capability thereof in the chemical plant. Diameters of approximately 10–200 mm, especially diameters of up to 100 mm, appear expedient for this purpose.

Carrier bodies of the aforementioned type are, according to the invention, released into a sea current. The specific weight thereof is set or adjusted in such a way that the carrier bodies sink in a controlled manner. Thus, along their path from a discharge of the catching or collecting thereof, the carrier bodies are in engagement with the water long enough that a sufficient accumulation of uranium on the carrier body or its active centers can occur. The carrier bodies are then caught up or collected at a depth which is dependent upon the falling time of the bodies (for example, carrier bodies are caught or collected by a generally horizontal sieve or plate). From there, the carrier bodies are conveyed for further treatment by elution or preparation, as for example to a chemical plant located at the surface of the sea, where the carrier bodies are separated from the accumulated heavy metal. The bodies freed from the heavy metal are then transported again to the discharge location or to the outlet or discharge. The method operates continuously.

The installation of the plant or system in a sea current is expedient to assure a sufficient subsequent delivery of uranium-rich sea water, which means, to hinder or preclude an impoverishment or reduction of the strength of sea water uranium in the concentration field or "adsorption region" of the system. Sea current in coastal regions has current speeds of slightly more than one meter per second. Sea flows of 0.5 meters per second are extensive, where such plants can be set up in a purposeful manner. An adaptation or matching to every suitable flow speed, however, is easily attainable or possible by a corresponding change of the distance between the outlet or discharge and catching or collecting, and also suitably the discharge cycle of the carrier body.

Figure 2:
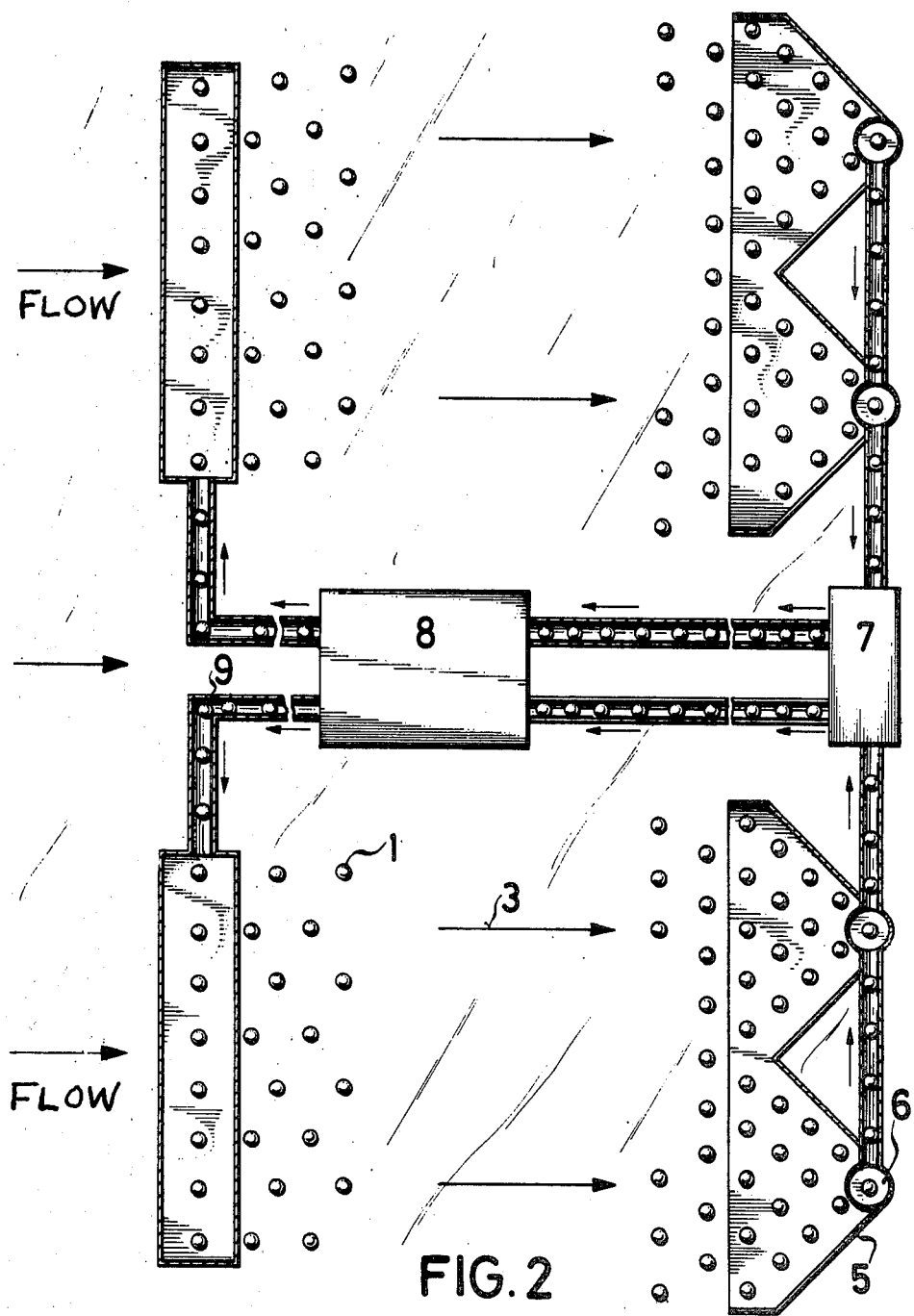
FIG. 2 shows in plan the system of FIG. 1.

Referring now to the drawings in detail, FIGS. 1 and 2 show how carrier bodies 1 are discharged from an outlet 2 in free fall into a sea current or stream 3. The outlet or discharge 2 lies at such a depth (of for example approximately 5 meters) below the water level that surface disturbances brought about by wind or other causes no longer affect a constant flow profile or characteristic which is conventionally in the medium up to at least 50 meters depth.

The carrier bodies 1, in their falling movement, are carried off by the current or stream, and after passing through a distance or stretch 4, arrive in a catching and collecting device 5, from where they are guided into a conveyor route or line 6. The conveying system, which operates best hydraulically according to the principle of communicating pipes (schematically indicated by the reference numeral 7 without thereby in any way fixing the position or manner of operation of the conveying system), takes care of the transporting of the "loaded" or "charged" carrier bodies to a chemical plant 8, in which further working or treatment occurs. The carrier bodies, freed of the accumulated heavy metal, come back to the outlet 2 by way of a line or conduit 9.

The carrier bodies 1, discharged in free fall from the outlet 2 into the current or stream 3, are subjected to practically no irregular influences which would cause a delay or spreading, diffusion or fanning out of the carrier bodies. Rather, carrier bodies can be collected in the collecting device 5 without any losses worth mentioning.

In the preceding description, the essential plant portions, including carrier body outlet and catching, collecting devices, conveyor distance, as well as chemical plant, are shown lying practically in one direction (the direction of flow). In practice, this is generally true for the outlet and gathering or collecting, whereas the conveyor distance could, however, also be located for example along the edge of the current or stream. Likewise, parts of the chemical plant, could be provided in the lower region of the system.

An impression of the possible dimensions of such a plant is obtained by the following overall calculations for an example of the system:

The volume flow Q is provided by the equation:

$$Q = \frac{\dot{M}_{Ucon}}{\eta_{con}[U]_{MW}} = 6.8 \times 10^8 \, m^3/d$$

in which $\dot{M}_{ucon}$ is the uranium quantity to be concentrated/time (670 kg/d);

$\eta$con is the efficiency or degree of concentration (30%; and $[U]_{MW}$ is the uranium concentration in sea water(3.3 ppb).

For the inlet cross section F there is then obtained:

$$F = Q/s = 15700 \, m^2$$

with s (flow speed of the sea water)=0.5 m/s.

The level, height, or depth, H, of the system results from the sinking speed, $s_{sink}$, of the bodies of for example 0.08 m/s, and from the necessary concentration time, $t_{con}$, of for example 10 minutes, according to the following equation:

$$H = t_{con} \times s_{sink} = 50 \, m.$$

The width W and the length L of the system are obtained by the following equations:

$$W = F/H = 314 \, m$$

$$L = s \times t_{con} = 300 \, m.$$

The conveyor system, at the end of the running distance or path L, conveys the carrier bodies to the water surface. The conveyor system operates best hydraulically, and is designed according to the principle of communicating pipes, since such a system requires the least construction complexity and has the smallest power requirement.

According to the example described herewith, approximately 50,000 m³ of carrier bodies are conveyed per hour. Since the bodies cannot be permitted to be wedged or bound in the conveying system, approximately double the water quantity is necessary, i.e., 100,000 m³ per hour. The power requirement is calculated according to the following equations:

$$L_{th} = \dot{V} \times \Delta P$$

$$\Delta P = \lambda \times (\rho/2) \times w^2 \times (L/d)$$

With the assumption that the conveying is to occur through 10 pipes having 1.4 meter diameter each, there results with a conveying speed of $\dot{V} = 2.8 \, m^3/s$ a theoretical power requirement of $L_{th} = 80$ kW. Including the pump efficiency of $\eta_p = 0.7$, and the efficiency of the hydraulic conveying of $\eta_{HF} = 0.35$, the actual power requirement $L_A = 228$ kW. This is very small compared with other conveyor systems.

The transporting of the carrier bodies to the chemical plant and to the delivery location can likewise be carried out hydraulically.

The inventive plant operates under optimum concentration conditions, since the environment of the body falling into the current renews itself automatically and in a continuous manner. The plant and operational costs are smaller than with positive renewal of the surroundings or environment of concentration bodies. Finally, the plant is so designed that it can be easily changed and adapted to different conditions.

Reference also can be made to a disclosure of German patent application No. P2914203.8-41 corresponding to U.S. patent application Ser. No. 262,828 filed concurrently herewith as to further details of the carrier bodies and the plant for gaining uranium from sea water. The carrier bodies having a lower density or specific gravity than water (set water) are discharged into a water layer, especially a natural sea current; after an automatic traversal thereof (conditioned by the density differing from that of water), the carrier bodies are collected again and, in a loaded or charged state, are conveyed to a further treatment to isolate the concentrated trace material; the carrier bodies are then again returned into the current or stream after, as the case may be, suitable depletion or removal of the concentrated material.

The solid material particles used for concentration, which here are designated as "carrier bodies" or "adsorber particles", are to have a capability for concentration of predetermined trace materials as with the method according to German patent application No. P2854679.4-24, which corresponds to the present U.S. application. In this connection, the special nature of the concentration procedure (by physical and/or chemical forces) should not be considered to have any decisive meaning for the inventive method. The concentrating solid particles are subsequently simply referred to as "carrier bodies", and it is preconditioned that these carrier bodies have concentration active centers arrestingly provided thereon or therein, with the centers themselves being suitably comprised in concentration active material, especially in the form of thin surface layers (upper surface layers) which are freely accessible for the water, yet are protected against mechanical attack by neighboring particles.

The carrier bodies have a density differing from that of water for attaining a suitable lift of the particles, with the aid of which the automatic traversal of the water layer is attained under appropriate requirements (for example, in time correlated with the trace material accumulation from the surrounding water). These carrier bodies can have a suitable form and size, whereby the size is expediently approximately one to ten centimeters. Naturally, however, larger or smaller carrier bodies are also usable. Criteria for the selection of specific carrier bodies are, in particular, a large ratio of enrichment active surfaces to volume, easy filterability or retention property of the carrier bodies, and the thickness of the hydrodynamic boundary layers on the enrichment active surfaces, which thickness depends upon the carrier body dimensions and should be as thin as possible. The carrier bodies may comprise a highly porous material.

A form of the carrier bodies as a ring is especially suitable for this method. If the concentration active material is mechanically wear resistant, the ring for example can be embodied as a torus. Otherwise, cylindrical rings may be more purposeful which are covered only upon the inner mantle surface thereof with concentration active material, so that wear, abrasion or removal of the active layer by mechanical contact with neighboring bodies is precluded. A ring has the advantage that the thickness of the stagnating hydrodynamic boundary layer on the active surface of the carrier bodies, even with larger carrier bodies, can be kept small. Since this boundary layer is also responsible for a quick loading or charging of the carrier body with tract materials, which are to be concentrated, the boundary layer should be as thin as possible. Especially advantageous are carrier bodies having thread, filament, or fiber structures, for example like the net or grid shown in FIG. 6, or like fiber fillings enclosed in a casing, as for example shown in FIG. 11. In this case, the characteristic dimension for the thickness of the boundary layer is determined by the fiber thickness. The characteristic dimension for the thickness of the boundary layer with cylindrical rings is given or provided by the diameter of the generating circle. On the other hand, for the retention capability of the carrier bodies floating on the upper surface through the grid, or the filtering capability thereof during the subsequent chemical process on board a ship, the (larger) ring diameter is determinative and is selected in such a way that the openings (mesh) of the particular retention device (grid or filter) need not be dimensioned too small. This serves the purpose of keeping the flow resistance of the grids or filters small.

An especially advantageous behavior of such a ring for trace material concentration exists when its (pole-) axis means practically in the direction of movement. In order to attain such a condition, the center of gravity of the ring should lie upon the axis thereof but in a predetermined spacing from the center of symmetry. A still further improvement can be attained when the ring or carrier bodies are forced into an automatic spinning or "spiral" movement.

Figure 6:
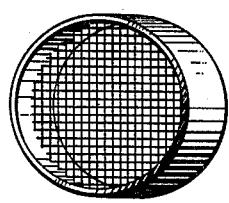
FIG. 6 shows an annular or ring body provided with a net or grid for use in accordance with the present invention.
Figure 7:
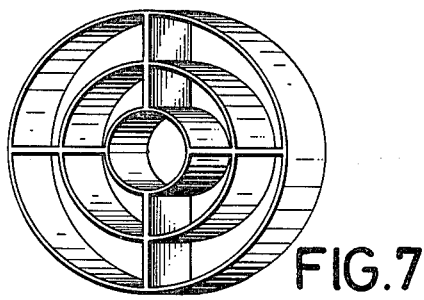
FIG. 7 shows another annular body provided with concentric rings interconnected by radial struts for use in accordance with the teaching of the present invention.
Figure 8:
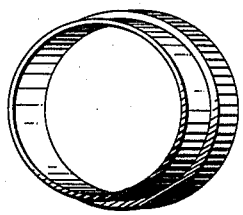
FIG. 8 shows an annular body having an additional ring located on the outer periphery at one end thereof for purposes of the present invention.
Figure 9:
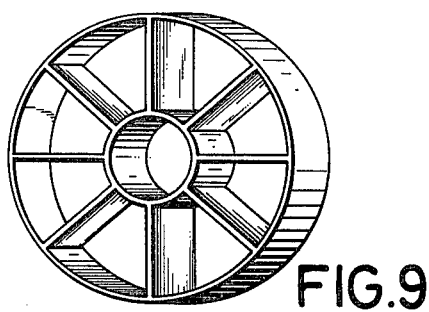
FIG. 9 shows an annular body having radial struts and a central annular ring-shaped hub for use in accordance with the present invention.
Figure 10:
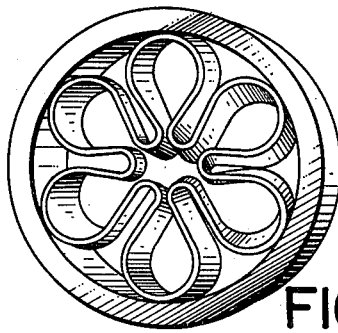
FIG. 10 shows an annular body with a conical cross sectional profile for stabilization of the ring axis in the direction of movement, and is provided with a rosette arrangement secured within the confines of the annular body.
Figure 11:
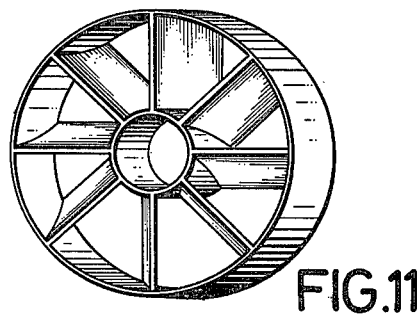
FIG. 11 illustrates a perforated hollow sphere or ball forming a casing or jacket for sponge or balled-up, snarled material layered reactively or reactive in itself.
Figure 12:
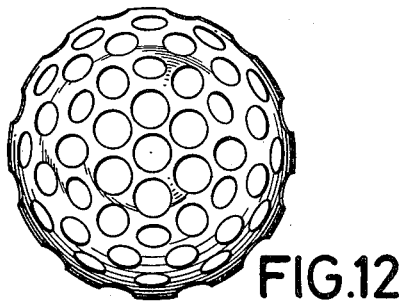
FIG. 12 shows an annular body provided with twist guide surfaces which extend essentially radially but not axially parallel to force an automatic spinning or twist movement in accordance with the present invention.
Figure 13:
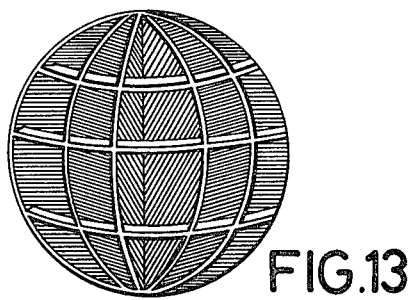
FIG. 13 shows a further embodiment having two or more discs extending vertically with respect to each other to generate a body framework with additional crossbeams or curved pieces to protect against contact with neighboring parts in accordance with the teaching of the present invention.

As shown in detail by the drawings, the net, screen, mesh or grid provides filling surfaces with the annular body according to the illustration of FIG. 6. FIG. 7 shows concentric rings with radial struts. FIG. 9 is an additional variation. Annular bodies having a conical cross sectional profile or an additional ring for stabilization of the ring axis in the direction of movement are shown in FIGS. 8 and 10. FIG. 10 also shows a rosette arrangement of foil reactively layered on both sides to enlarge the enrichment active upper surface. FIG. 11 illustrates built-in twist-guide surfaces which extend in essence radially, but not axially parallel, to force an automatic spinning or spiral movement during rising of the carrier body. FIG. 12 illustrates a configuration of a carrier body diverging from the annular form by having a perforated hollow sphere or ball forming a casing or jacket for sponge-type or balled up, snarled or skein-like reactive material or reactively layered material. A further embodiment is shown in FIG. 13 and is formed by interfitted discs or annular plates which in the simple form includes two or three discs extending vertically to each other while generating a body framework, the rebound surfaces of which are protected against contact with adjacent particles by additional brackets or curved arc members.

The carrier bodies used in accordance with the present invention have a density less than that of water, and are discharged at a predetermined depth in a water layer which is to be depleted. The carrier bodies, as a consequence of the lift capability thereof, move to the water level or upper surface, where the carrier bodies are collected and elutriated, or are treated in a different manner, to recover trace material concentrated on the surfaces of the carrier bodies.

The water layer is subjected to a continuous depletion corresponding to the tract material concentration on the carrier bodies, and the water layer accordingly should be continuously renewed, which is attained by a continuous relative movement between the outlet and collection on the one hand and the water layer on the other hand. Such a relative movement can be brought about either thereby that the carrier body discharge and collection are drawn or pulled through the water by a boat, or by arranging the devices in a natural water flow or current.

Figure 3:
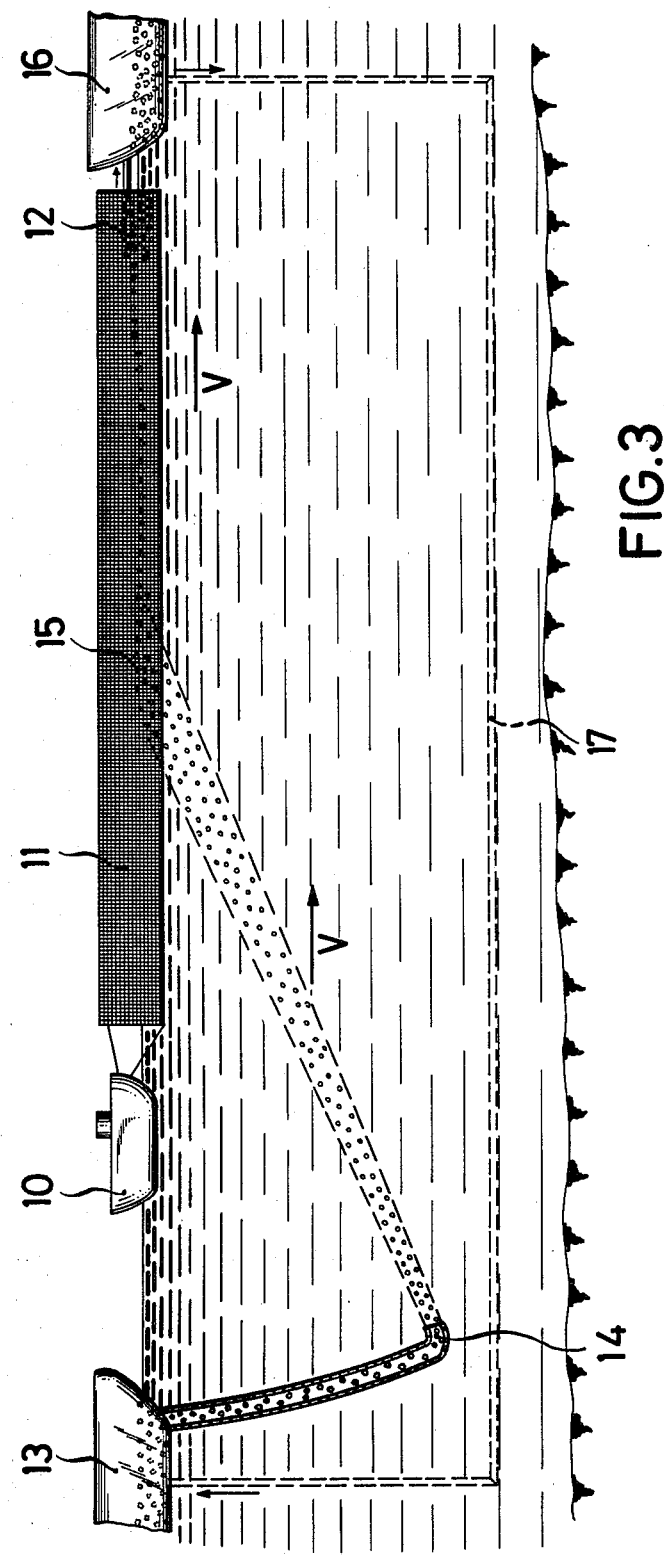
FIG. 3 is a side elevational view of a trace material concentration plant in accordance with the present invention.
Figure 4:
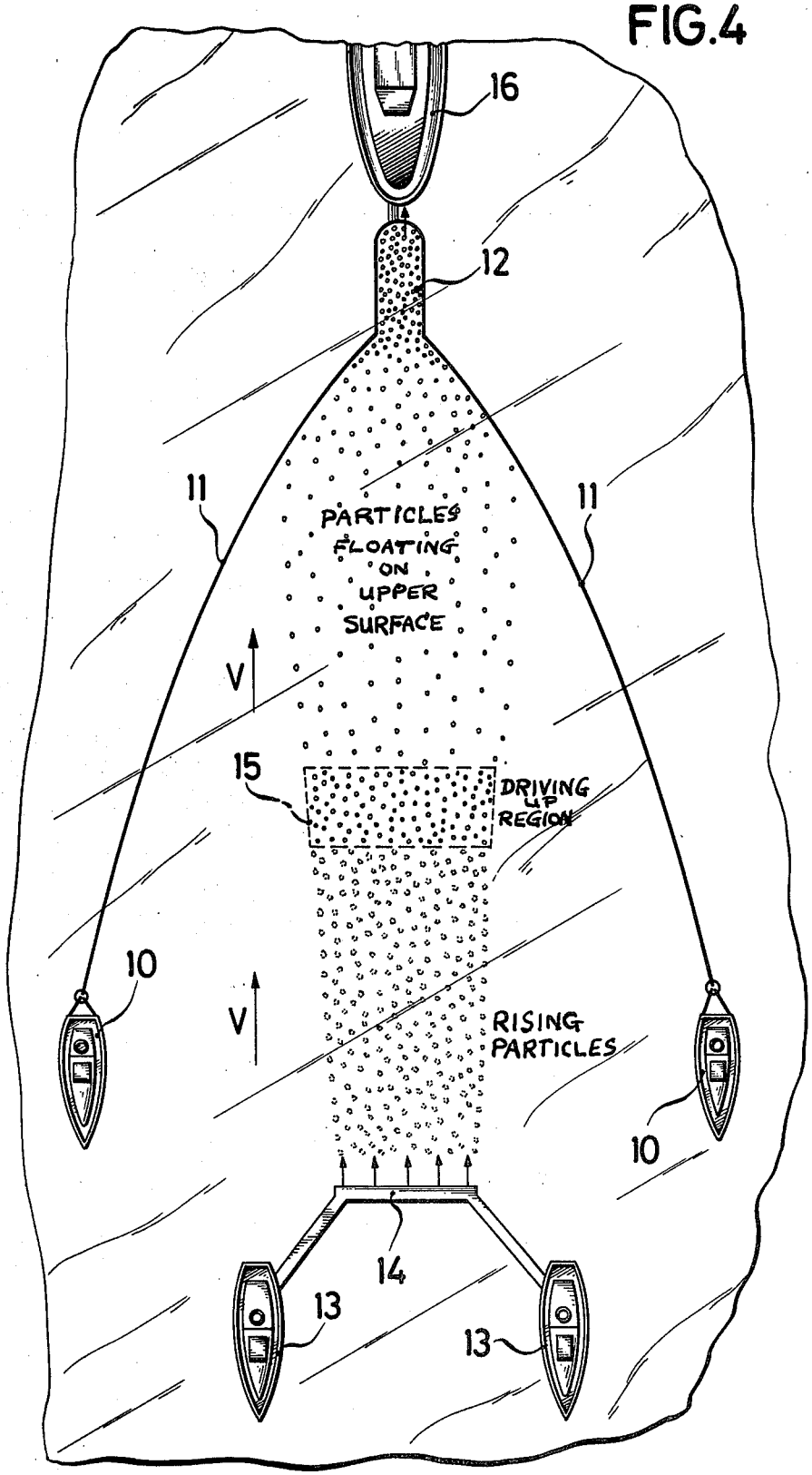
FIG. 4 is a plan view of the plant of FIG. 3.
Figure 5:
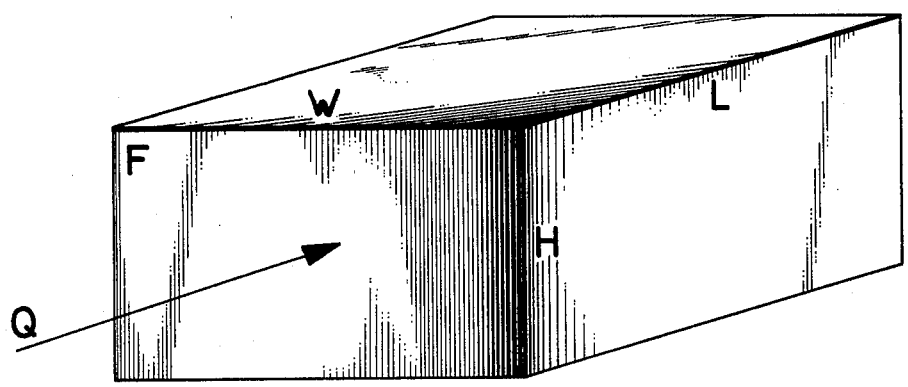
FIG. 5 is a view to illustrate the symbols used in the subsequent disclosure.

According to FIGS. 3 and 4, two ships or boats 10 hold a mesh or net-type grid 11 floating upon the water level or upper surface of the water. The grid 11 terminates in the form of a narrowed end 12. Two ships 13 hold a carrier body outlet or discharge 14 suspended in water; carrier bodies discharge into the water at the desired water depth from this outlet.

By means of the relative movement of the boats or ships, or the outlet and catch-up or collecting devices, relative to the water, the water layer, into which the carrier bodies are discharged is continuously renewed, and the vertical component of the carrier body movement is superimposed by the horizontal component relative to the outlet and catch-up collector devices. Such superimposed horizontal component is brought about by the corresponding flow speed of the water or a corresponding traveling speed of the ships or boats.

The carrier bodies reach the water level or upper surface in the area or region 15 within the upper surface grid 11. The relative movement finally effects or brings about that the carrier bodies driven against the upper surface collect in the area or region 12, from which the carrier bodies are continually withdrawn, for instance by a ship 16. When the carrier bodies are sufficiently loaded or charged with trace material after traversing the water layer, they can be regenerated in the ship or boat 16, and either subsequent thereto or directly returned to the ships or the outlet 14, for instance by way of a pipeline 17 extending under the water.

For receiving the adsorber particles which have arrived in the area or region 12, the following possibilities exist:

(1) the particles are suctioned from the closed grid at the upper surface;

(2) the grid is opened at the end of the area or region 12, so that the grid is effective like an upper surface funnel which becomes narrower. The flow or stream of particles floating on the upper surface passes directly into a receiving hatch or louver, which is located at the bow of a ship.

A numerical example for recovering uranium from sea water illustrates the dimensions of such a plant. With a desired production rate of one ton of uranium per day, a starting concentration in natural sea water of $3.3 \times 10^{-9}$ tons uranium per ton sea water, and a desired depletion of around 30%, $10^9$ tons of sea water per day must be brought into intimate contact with suitable adsorber particles. The water volume which according to the described method is daily brought into contact with the introduced adsorber particles is $V = B \times T \times v \times t$, where B is the width of the discharge opening (14), T is the depth of this opening below water, v is the relative speed between the opening 14 and the surrounding water, and t is the time (one day). With values of $B = 150$ meters, $T = 150$ meters, $v = 0.5$ meters per second, and $t \simeq 10^5$ s (1 day), the goal of $10^9$ tons per day is achieved.

If the adsorber particles are so produced that the lift speed thereof is approximately 0.1 meters per second, the lift or rising time thereof amounts to approximately 1,000 seconds rounded off. For the lateral drift or lateral diffusion in the upper surface water of the sea, an effective "diffusion constant" between 0.1 and 1 (m$^2$/s) square meters per second can be assumed. This would lead to the diameter of the lift area or region 15 relative to the outlet 14 on both sides experiencing an additional widening or spreading of approximately 20 meters. If the catching or collecting grid 11 is given an opening width of approximately 500 meters, no loss is to be feared by particles coming to the upper surface outside the catching or collecting device. A possible leakage rate of the first catching or collecting grid can also be counted by installation of a second catching or collecting grid located further outwardly.

The carrier body quantity which must be delivered per unit of time from the discharge depends particularly upon the loading or charging kinetic of the carrier bodies, proceeding on the basis that within the lift or rising time (for instance 1,000 seconds), a sufficient depletion is to occur in the water layer which is involved in this proceeding. Principally, as carrier bodies, all chemically suitable adsorbers or accumulation active substances can be used which themselves, or worked in with the corresponding light carrier material, fulfill the lifting or rising requirements.

From the treatment or processing, the regenerated carrier bodies are transported to the discharge ship 13 by pipe conduits or by ship.

The present invention is, of course, in no way restricted to the specific disclosure of the specification and drawings, but also encompasses any modifications within the scope of the appended claims.

What we claim is:

1. A method of recovering dissolved trace materials from a body of natural water having a bottom by fixation on carrier bodies, said method comprising the steps of:
   continuously releasing sinkable carrier bodies capable of affixing said trace materials from said water and allowing same to freely descend in said water;
   collecting said freely descending carrier bodies at a selected depth above the bottom of said body of natural water; said depth depending upon the density and falling speed of the carrier bodies in such a manner that the time between their release and collection would suffice to affix a predetermined amount of said trace materials; and
   conveying said collected carrier bodies to a further treatment for the isolation of said fixed trace material; said water traversed by said carrier bodies being continuously replaced by the flow of a natural current.

2. A method according to claim 1, which includes the use of said carrier bodies of inert material whose inner surfaces not contactable by adjacent carrier bodies are covered by a layering capable of concentration.

3. A method according to claim 1, which includes allowing said carrier bodies to descend through the water approximately 100 m prior to being collected by said collection device.

4. An apparatus for recovering trace material from bodies of natural water having a bottom, including sea water, by concentration on sinkable carrier bodies continuously released and allowed to pass in free fall through said water which comprises:
   a carrier body outlet located below the level of the water;
   a collection device arranged at the end of a free-fall path of said carrier bodies and above the bottom for collecting said at a selected depth in said water above the bottom of the body of water; said depth depending upon the density and falling speed of the carrier bodies in such a manner that the time between their release and collection would suffice to affix a predetermined amount of trace material; and
   a conveying device for conveying said collected carrier bodies to a further treatment location for the isolation of said concentrated trace material; said water being continuously replaced as a result of the flow of a natural current.

5. An apparatus according to claim 4, in which said carrier bodies are mechanically stable and have a surface freely accessible for said water and being protected against contact by adjacent bodies.

6. An apparatus according to claim 5, in which said carrier body is a spheroidal structure.

7. An apparatus according to claim 4, in which said carrier body is selected from the group consisting of thread-like, fibrous, and sponge-like bodies.

8. An apparatus according to claim 7, in which said bodies have a grid-like casing.

9. An apparatus according to claim 4, in which the diameter of said carrier body is in the range of about 10 to 100 mm.

10. An apparatus according to claim 4, in which said conveying device includes communication pipes which operate hydraulically to convey said carrier bodies from the collection point to said further treatment location.

11. A method of concentrating a trace material dissolved in a body of water having a bottom and having a layer with a natural current by accumulation of the trace material on the surface areas of carrier bodies, said carrier bodies having a density greater than that of water, the method comprising the steps of:
   discharging the carrier bodies into the body of water at a discharge station positioned in spaced relation to the bottom of the layer;

allowing the carrier bodies to sink through a layer while being transported horizontally by the current;

accumulating the trace material on the exposed surface areas of the carrier bodies by adsorption as the carrier bodies sink and are transported by the current;

intercepting the carrier bodies before the carrier bodies reach the bottom by collecting the carrier bodies downstream of the discharge station after the carrier bodies have sunk through at least a portion of the layer and have accumulated trace materials thereon;

removing trace material from the carrier bodies after the carrier bodies have been collected, and returning the carrier bodies with the trace material removed therefrom upstream to the discharge station for subsequent discharge to again adsorb trace material in the layer of the body of water as the current brings additional trace material into proximity of the carrier bodies.

12. The method of claim 11 wherein the trace material is uranium and the body of water is seawater.

13. The method of claim 11 or 12 wherein the surface area of each carrier body substantially exceeds the exterior dimensions thereof wherein collisions between the bodies do not dislodge substantial amounts of trace material.

14. The method of claim 11 or 12 wherein the carrier bodies are annular.

15. The method of claim 11 or 12 wherein the carrier bodies are porous.

16. Apparatus for concentrating trace materials dissolved in a body of water having a layer with a natural current and having a bottom, the apparatus comprising in combination:

a multiplicity of carrier bodies, each having a density which is greater than the density of water and each having a surface area for adsorbing the trace material thereon;

means for releasing the carrier bodies into the layer wherein the carrier bodies sink downwardly through the layer while being carried downstream by the natural current in order to adsorb trace material on the carrier bodies;

means downstream from the releasing means and spaced from the bottom for collecting the carrier bodies after the carrier bodies have adsorbed the trace materials but before the carrier bodies reach the bottom of the body of water;

means for removing the trace material from the carrier bodies, and means for returning the carrier bodies upstream to the release means to again collect the trace material.

17. The apparatus of claim 16 wherein the carrier bodies each have a surface area which greatly exceeds the exterior boundaries of the carrier bodies whereby substantial portions of the trace material are not dislodged upon collision of the carrier bodies.

* * * * *